(12) United States Patent
Vasseur et al.

(10) Patent No.: US 10,038,713 B2
(45) Date of Patent: Jul. 31, 2018

(54) PREDICTED ATTACK DETECTION RATES ALONG A NETWORK PATH

(71) Applicant: Cisco Technology, Inc., San Jose, CA (US)

(72) Inventors: Jean-Philippe Vasseur, Saint Martin d'Uriage (FR); Javier Cruz Mota, Assens (CH); Andrea Di Pietro, Lausanne (CH)

(73) Assignee: Cisco Technology, Inc., San Jose, CA (US)

( * ) Notice: Subject to any disclaimer, the term of this patent is extended or adjusted under 35 U.S.C. 154(b) by 80 days.

(21) Appl. No.: 14/270,759

(22) Filed: May 6, 2014

(65) Prior Publication Data
US 2015/0326598 A1    Nov. 12, 2015

(51) Int. Cl.
| G06F 11/00 | (2006.01) |
| G06F 12/14 | (2006.01) |
| G06F 12/16 | (2006.01) |
| G08B 23/00 | (2006.01) |
| H04L 29/06 | (2006.01) |

(52) U.S. Cl.
CPC .......... *H04L 63/1458* (2013.01); *H04L 63/10* (2013.01); *H04L 63/1433* (2013.01); *H04L 63/1441* (2013.01); *H04L 63/20* (2013.01)

(58) Field of Classification Search
CPC ........................... H04L 63/1433; H04L 63/20
USPC ........................................................ 726/25
See application file for complete search history.

(56) References Cited

U.S. PATENT DOCUMENTS

| 6,067,535 | A  | * | 5/2000  | Hobson .................... G06N 3/02 706/10 |
| 6,633,886 | B1 | * | 10/2003 | Chong .............. G06F 17/30595 707/798 |
| 7,603,709 | B2 |   | 10/2009 | Lewis et al. |
| 9,292,695 | B1 | * | 3/2016  | Bassett ................. G06F 21/577 |
| 2003/0133443 | A1 | * | 7/2003  | Klinker .................. H04L 29/06 370/353 |
| 2004/0103058 | A1 |   | 5/2004  | Hamilton |
| 2004/0148520 | A1 | * | 7/2004  | Talpade .............. H04L 63/1458 726/22 |
| 2005/0286772 | A1 |   | 12/2005 | Albertelli |
| 2007/0086358 | A1 | * | 4/2007  | Thubert .................. H04L 45/12 370/254 |
| 2008/0083029 | A1 | * | 4/2008  | Yeh ..................... H04L 63/1441 726/22 |
| 2008/0183659 | A1 | * | 7/2008  | Kuttan ................ G06F 11/2247 |

(Continued)

OTHER PUBLICATIONS

Christian Prehofer; Self-Organization in Communication Networks: Principles and Design Paradigms.*

(Continued)

*Primary Examiner* — Monjour Rahim
(74) *Attorney, Agent, or Firm* — Parker Ibrahim & Berg LLP; James M. Behmke; Stephen D. LeBarron

(57) ABSTRACT

In one embodiment, attack detectability metrics are received from nodes along a path in a network. The attack detectability metrics from the nodes along the path are used to compute a path attack detectability value. A determination is made as to whether the path attack detectability value satisfies a network policy and one or more routing paths in the network are adjusted based on the path attack detectability value not satisfying the network policy.

18 Claims, 15 Drawing Sheets

(56) References Cited

U.S. PATENT DOCUMENTS

| | | | |
|---|---|---|---|
| 2009/0077666 A1* | 3/2009 | Chen | G06F 21/577 726/25 |
| 2009/0122697 A1* | 5/2009 | Madhyasha | H04L 12/2697 370/229 |
| 2011/0228696 A1 | 9/2011 | Agarwal et al. | |
| 2012/0054866 A1* | 3/2012 | Evans | H04L 63/1416 726/23 |
| 2012/0096549 A1* | 4/2012 | Amini | H04L 63/1433 726/23 |
| 2013/0010610 A1* | 1/2013 | Karthikeyan | H04L 12/2423 370/242 |
| 2013/0031596 A1* | 1/2013 | Becker | G06F 21/556 726/1 |
| 2013/0298184 A1 | 11/2013 | Ermagan et al. | |
| 2014/0201836 A1* | 7/2014 | Amsler | H04L 63/1425 726/23 |
| 2015/0026806 A1* | 1/2015 | Lingafelt | H04L 63/1441 726/23 |

OTHER PUBLICATIONS

Dietterich, T. G., "Ensemble Methods in Machine Learning", Lecture Notes in Computer Science, vol. 1857, pp. 1-15, Springer Berlin Heidelberg.

Gnawali, et al., "The Minimum Rank with Hysteresis Objective Function", Request for Comments 6719, Sep. 2012, 13 pages, Internet Engineering Task Force Trust.

Thubert, P., "Objective Function Zero for the Routing Protocol for Low-Power and Lossy Networks (RPL)", Request for Comments 6552, Mar. 2012, 14 pages, Internet Engineering Task Force Trust.

Vasseur, et al., "Routing Metrics Used for Path Calculation in Low-Power and Lossy Networks", Request for Comments 6551, Mar. 2012, 30 pages, Internet Engineering Task Force Trust.

Winter; et al., "RPL: IPv6 Routing Protocol for Low-Power and Lossy Networks", Internet Engineering Task Force, Request for Comments 6550, Mar. 2012, 157 pages.

* cited by examiner

PREDICTED ATTACK DETECTION RATES ALONG A NETWORK PATH

TECHNICAL FIELD

The present disclosure relates generally to computer networks, and, more particularly, to making routing decisions based on how predictable attack detection is along a path.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like also present unique challenges to LLNs.

One type of network attack that is of particular concern in the context of LLNs is a Denial of Service (DoS) attack. Typically, DoS attacks operate by attempting to exhaust the available resources of a service (e.g., bandwidth, memory, etc.), thereby preventing legitimate traffic from using the resource. A DoS attack may also be distributed, to conceal the presence of the attack. For example, a distributed DoS (DDoS) attack may involve multiple attackers sending malicious requests, making it more difficult to distinguish when an attack is underway.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
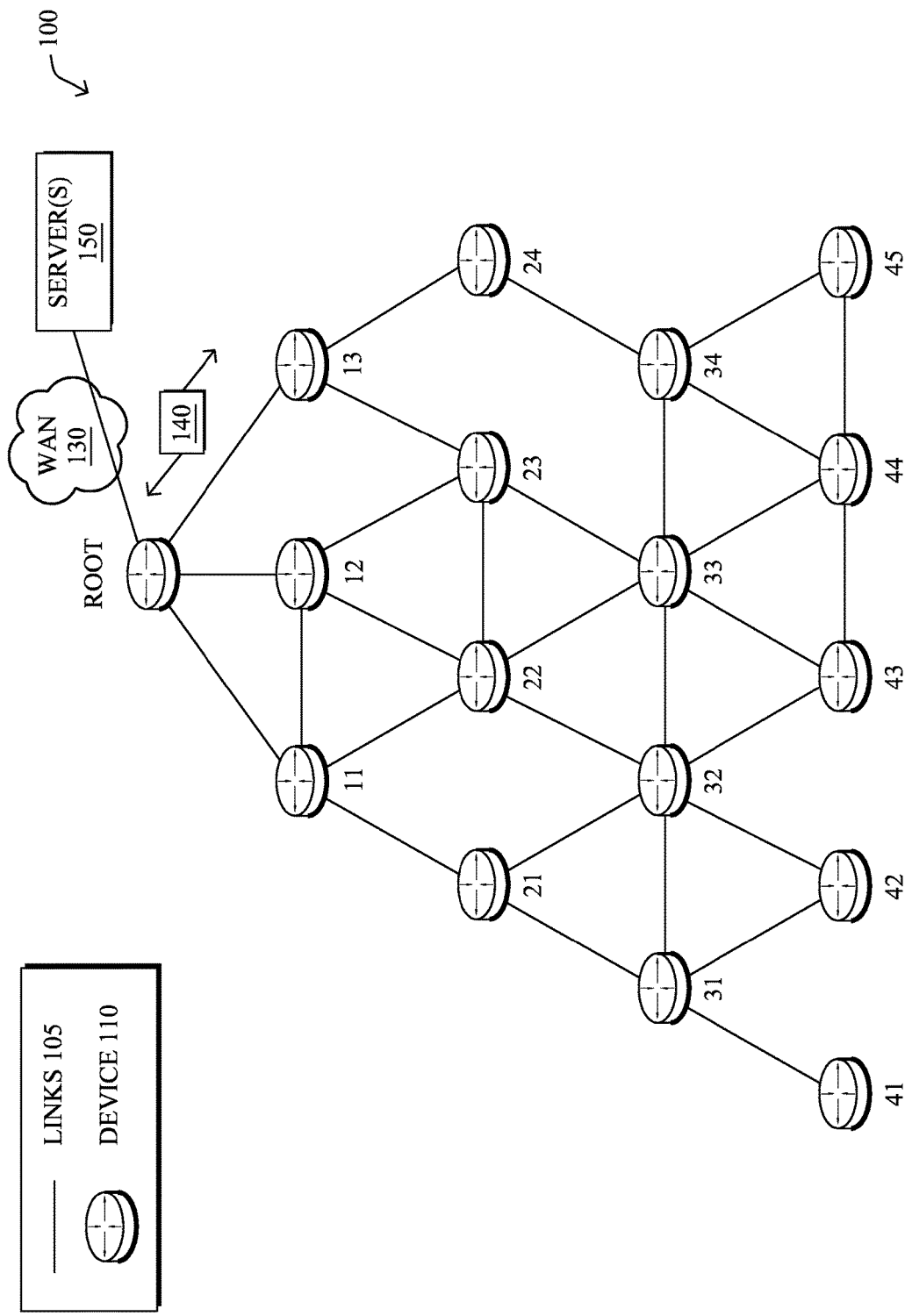
FIG. 1 illustrates an example communication network.

According to one or more embodiments of the disclosure, attack detectability metrics are received from nodes along a path in a network. The attack detectability metrics from the nodes along the path are used to compute a path attack detectability value for the path. A determination is then made as to whether the path attack detectability value satisfies a network policy and one or more routing paths in the network are adjusted based on the path attack detectability value not satisfying the network policy.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

In the context of LLNs, detection of DoS and other forms of network attacks is particularly challenging. In particular, the dynamic nature of LLNs and the effects of external network conditions make it difficult to determine when an attack is potentially underway. Greater care may also be required in an LLN when selecting a sensitivity level for an attack detection mechanism. Too low of a sensitivity level may leave the network vulnerable to an attack. However, too high of a sensitivity level may lead to false positives, which can have a greater negative impact on performance in an LLN than in other types of networks (e.g., due to the limited resources available in an LLN). Thus, a tradeoff is often made when selecting a sensitivity level for attack detection in an LLN. In addition, the training set of data used to train an attack detector may also affect the sensitivity of the detector. Accordingly, the degree of detectability of a network attack may vary for different routing paths in the network.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
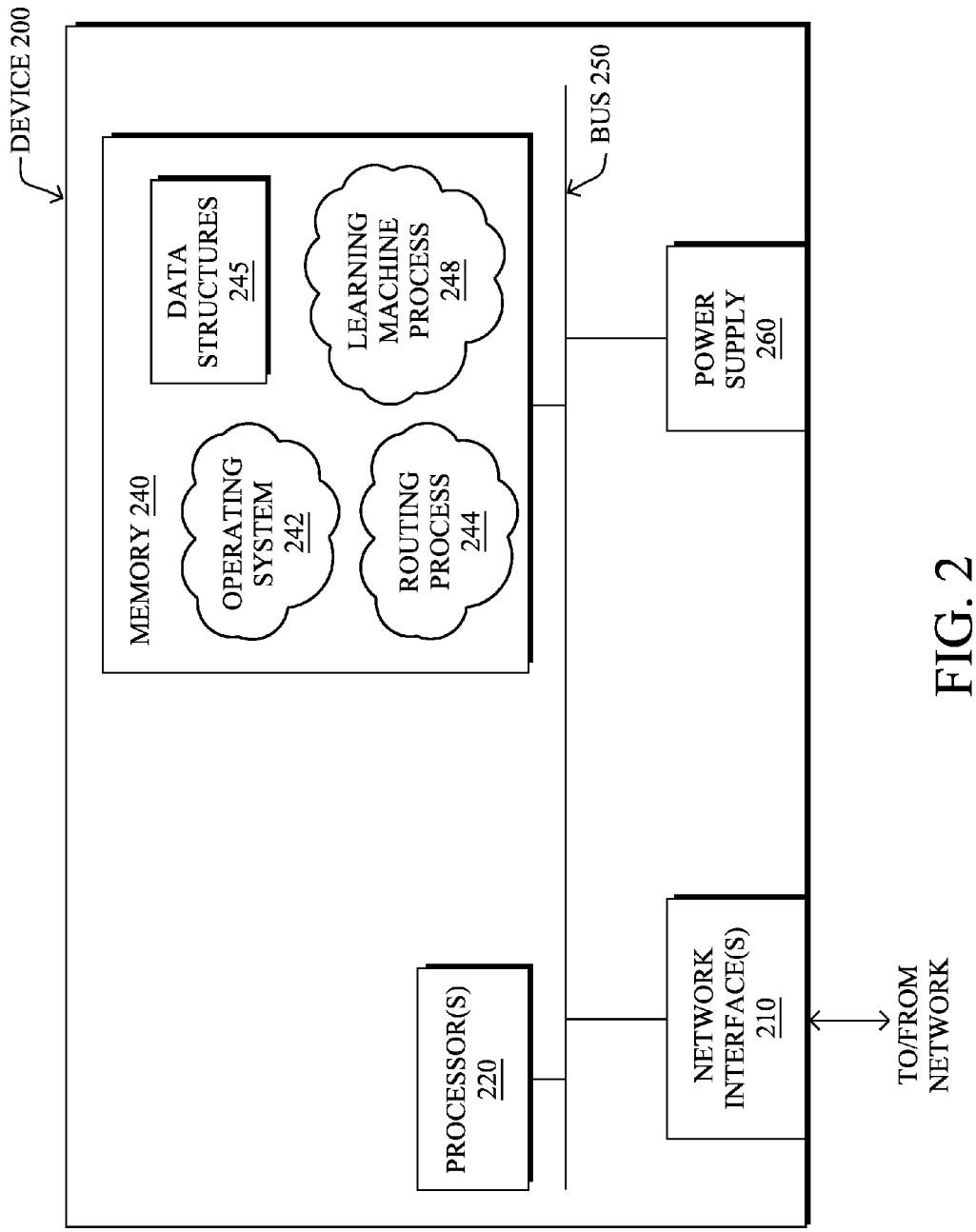
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine processes to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Learning machine process 248 contains computer executable instructions executed by the processor 220 to perform various functions, such as attack detection and reporting. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely one or more machine learning processes for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Artificial Neural Networks (ANNs) are a type of machine learning technique whose underlying mathematical models that were developed inspired by the hypothesis that mental activity consists primarily of electrochemical activity between interconnected neurons. ANNs are sets of computational units (neurons) connected by directed weighted links. By combining the operations performed by neurons and the weights applied by, ANNs are able to perform highly non-linear operations to input data. The interesting aspect of ANNs, though, is not that they can produce highly non-linear outputs of the input, but that they can learn to reproduce a predefined behavior through a training process. Accordingly, an ANN may be trained to identify deviations in the behavior of a network that could indicate the presence of a network attack (e.g., a change in packet losses, link delays, number of requests, etc.).

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by a DAG process) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks"<RFC 6551> by Vasseur, et al. (March 2012 version). Further, an example OF (e.g., a default OF) may be found in an IETF RFC, entitled "RPL Objective Function 0"<RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
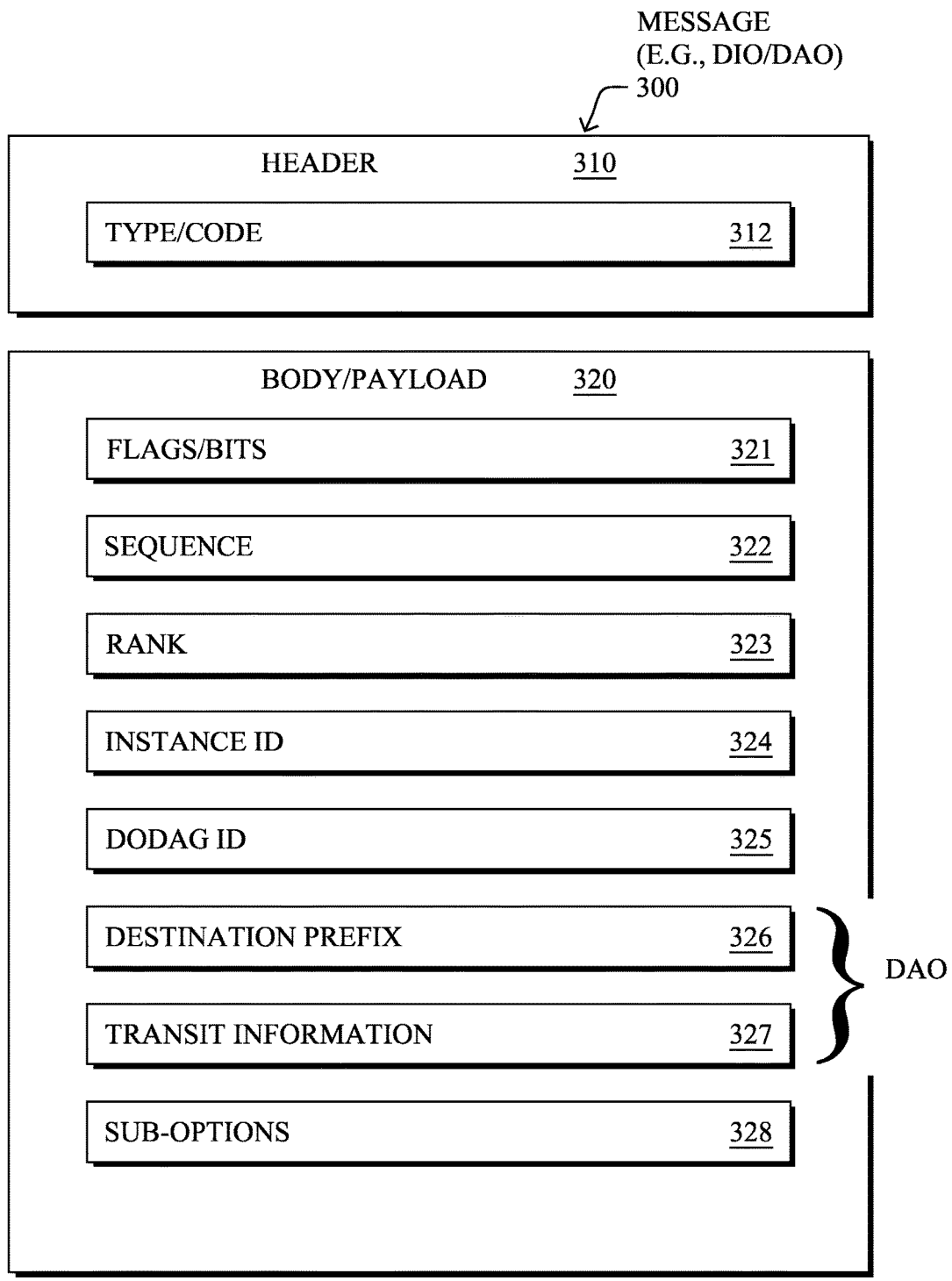
FIG. 3 illustrates an example message.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
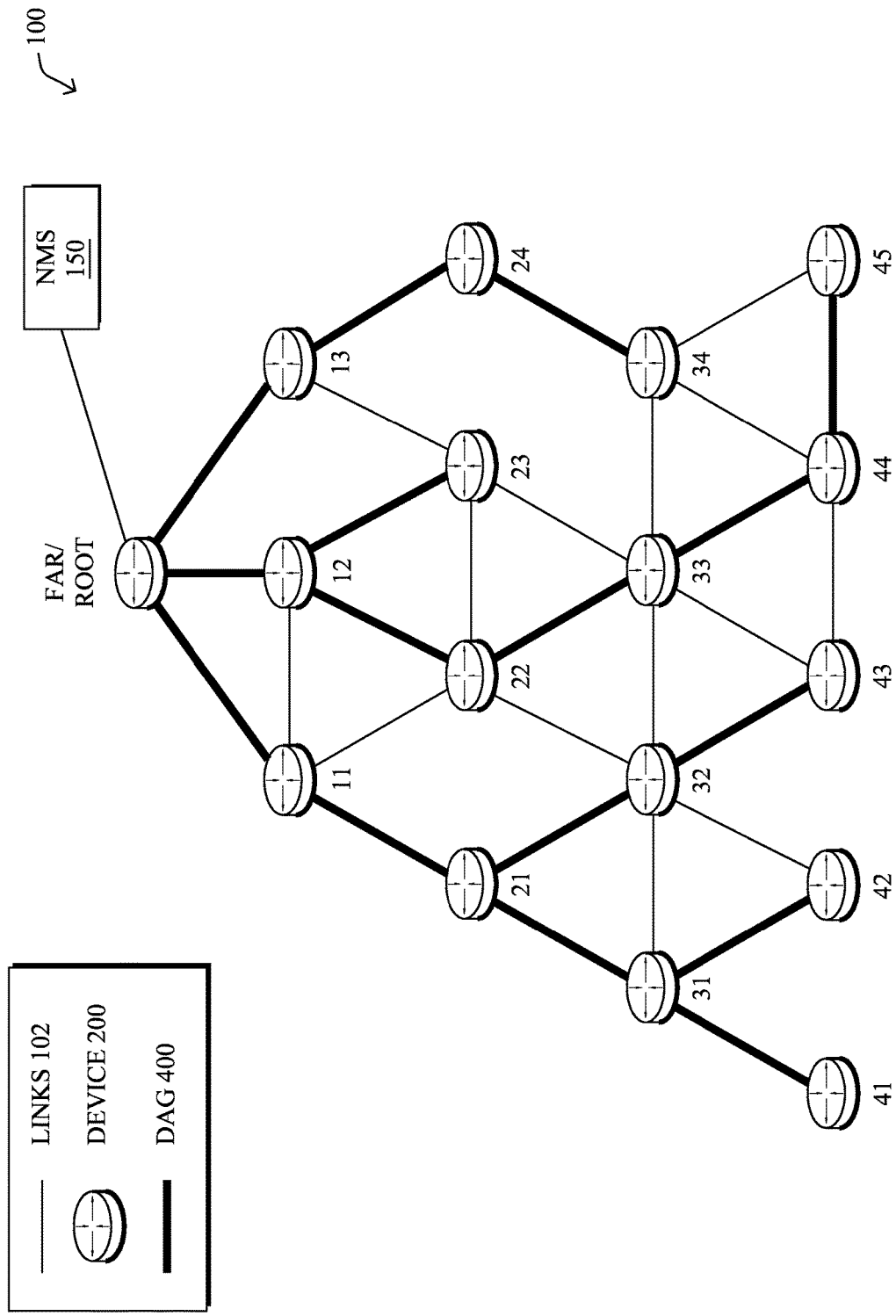
FIG. 4 illustrates an example directed acyclic graph (DAG) in the communication network of FIG. 1.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

Figure 5A:
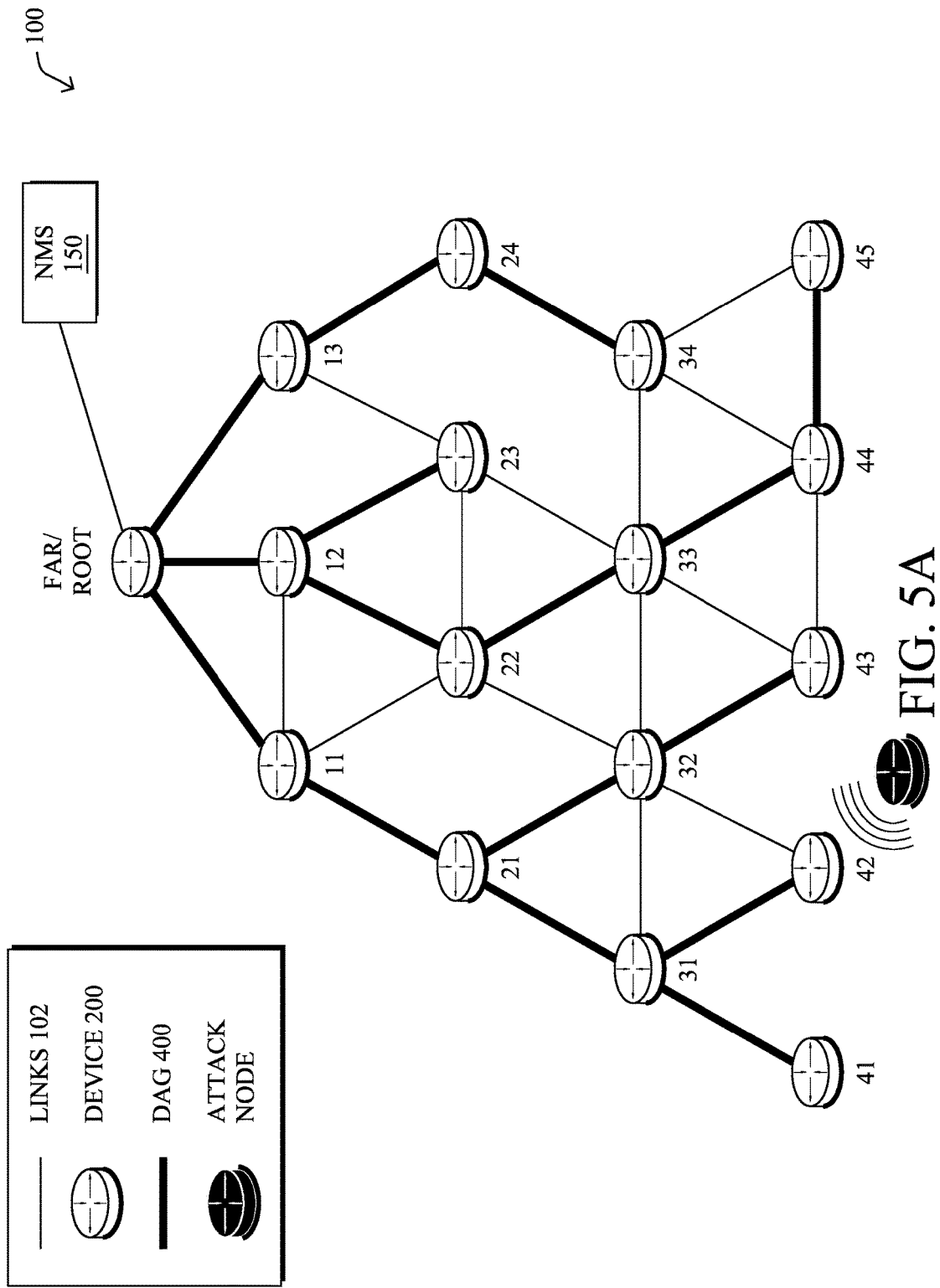
FIGS. 5A-5C illustrate an example of the detection and reporting of a potential network attack.
Figure 5B:
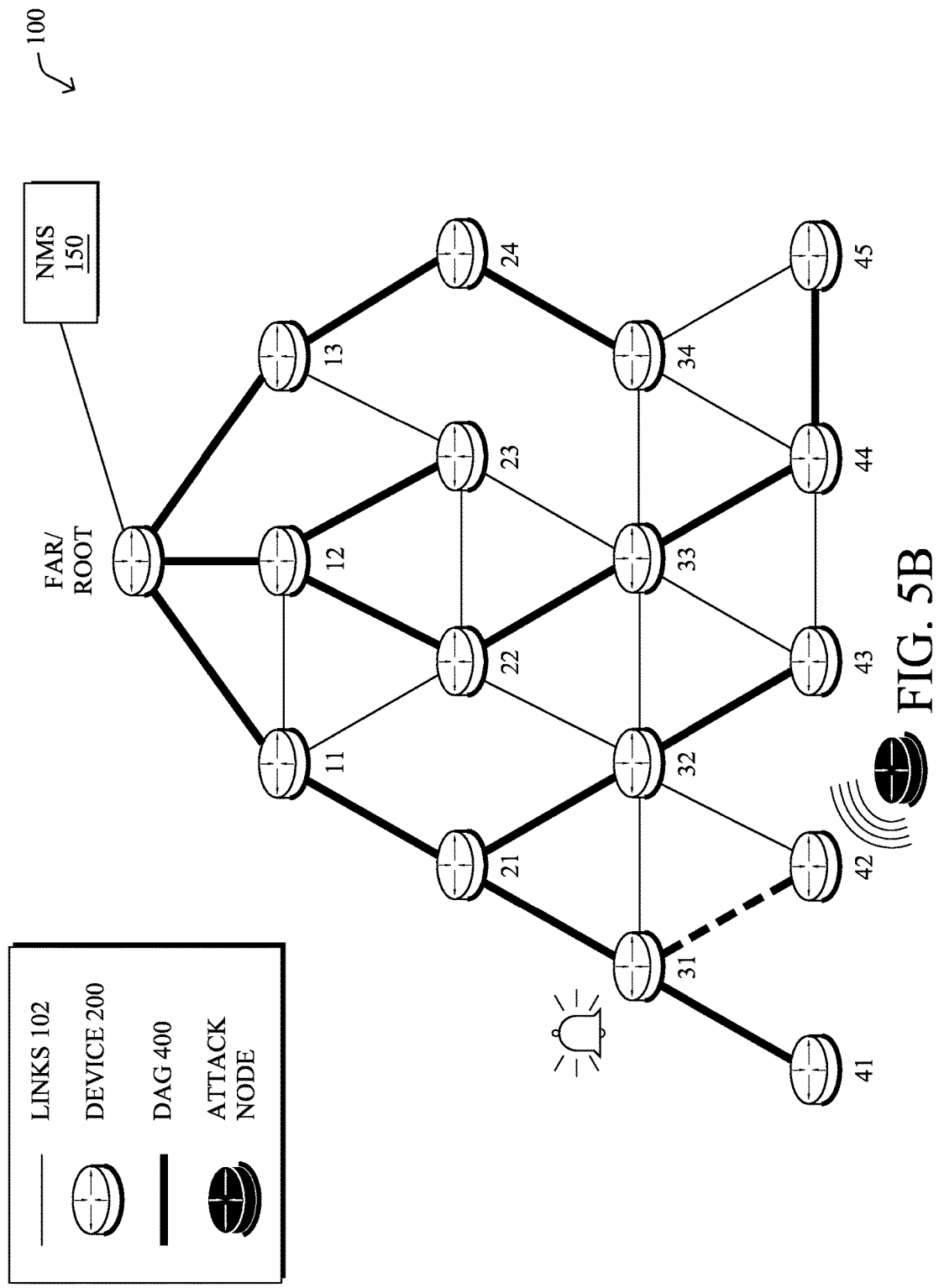
Figure 5C:
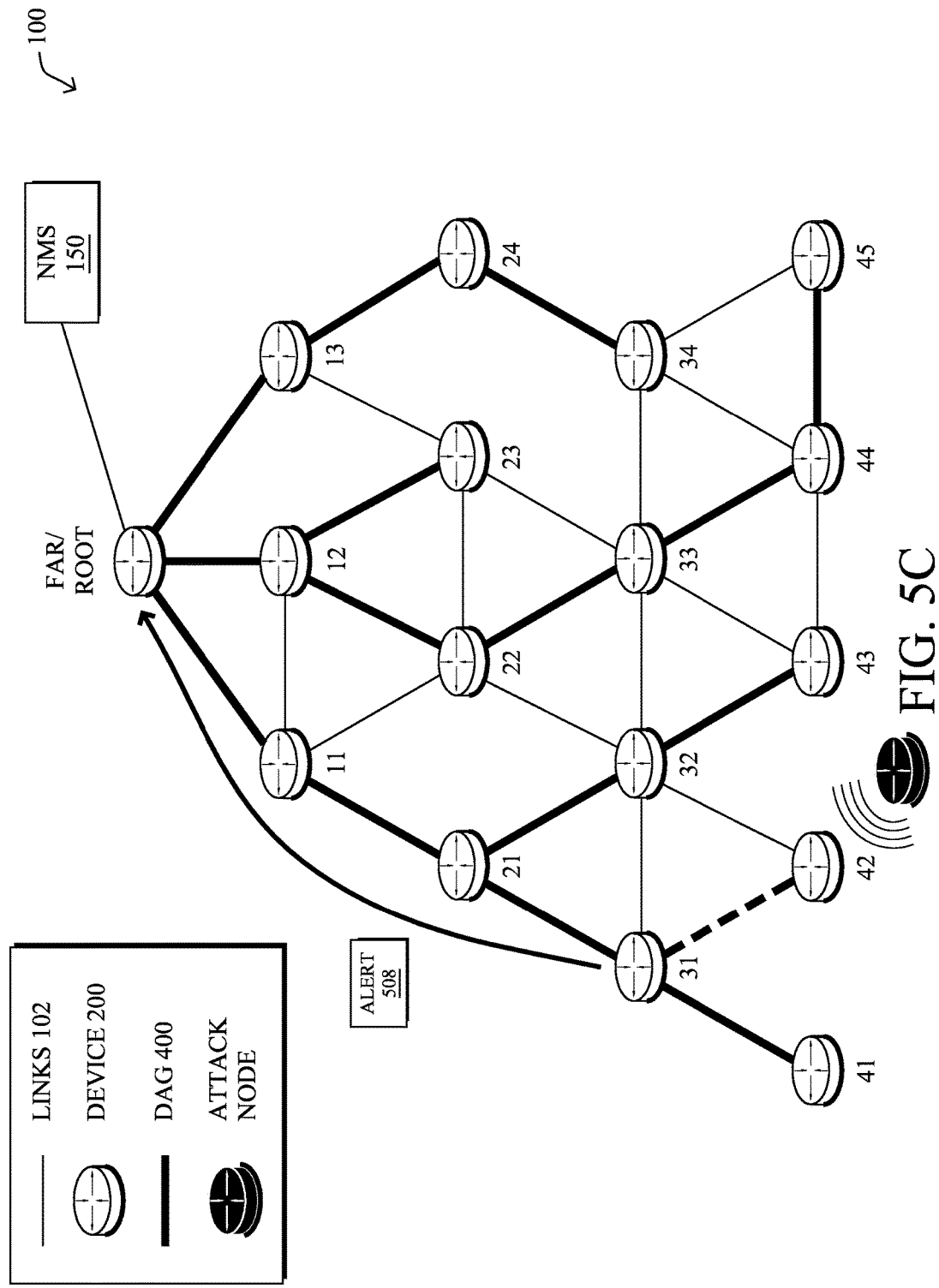

Referring now to FIGS. 5A-5C, an example is illustrated of a network attack being detected and reported within network 100. Any or all of the nodes/devices 200 shown may execute a learning machine process (e.g., learning machine process 248) that is configured to detect potential network attacks, such as a DoS attack. Assume for illustrative purposes that an attack node/device launches an attack targeted at node 42, as shown in FIG. 5A. As a result of the attack, the performance of the communication link between nodes 42 and 31 may change (e.g., by changing the degree of packet loss, by increasing number of requests originating from node 42, by increasing delays, etc.). In such a case, the learning machine process executed by node 31 may analyze the changes and determine that a potential attack has been detected, as shown in FIG. 5B. In response, as shown in FIG. 5C, node 31 may generate and send an alert 508 to a supervisory device such as the network FAR/Root, NMS, or other such device via which corrective measures may be taken (e.g., by alerting a human operator of the potential attack, instituting routing changes, etc.). As will be appreciated, alerts and other corrective measures may also be initiated by any other node in addition to that of node 31, such as node 42, other neighbors of node 42, other nodes farther up the DAG (e.g., nodes 21 and 11), etc.

As noted above, the IoT represents a completely different scenario in terms of attack detection from that of other types of networks. In contrast to other forms of networks, there is no central vantage point in IoT applications from which an attack can be observed. The high variability of this kind of network also means that the symptoms of an attack are not easy to detect and can be lost in the normal noise of the network behavior (e.g., traffic peaks and topology changes are quite normal in LLNs).

Scarce resources in IoT applications may also force reporting from network nodes to a central location to be reduced to a minimum. Thus, a tradeoff may be made in such networks regarding the sensitivity levels of the attack detectors. For example, if the learning machine on node 31 shown in FIG. 5C is too sensitive, alerts 508 may include false positives that needlessly consume network resources when reported to the FAR/DAG Root. In addition, where learning machine processes are used to detect attacks, the availability and/or applicability of a training data set may differ throughout the network. Accordingly, the attack detection processes on the various nodes may differ in terms of their sensitivities, meaning that attacks may be better detected along certain routing paths than others.

Predicted Attack Detection Rates Along a Network Path

The techniques herein provide for routing paths to be selected that can guarantee that an attack (e.g., a DoS attack or other forms of network attack) can be detected at or above a predefined success rate. Such a success rate may be included in a network policy and may be defined on a per-traffic type basis or may be globally applied to all traffic in the network. In some aspects, a new metric is specified that characterizes the attack detection rate along a path according to the performance of the learning machine processes executed by nodes along the path. Routing decisions may then be made by retrieving the required attack detectability in the policy (e.g., potentially on a per-traffic type basis), determining the paths followed by each traffic type, and computing the ability to detect an attack along each of the paths. For each path that cannot guarantee a high enough attack detection rate, alternative paths may be determined and provisioned in the network (e.g., between any pair of nodes, optionally with the granularity of the traffic type). In other aspects, a specific routing topology may be used in order to satisfy the attack detectability requirements in the network policy.

Specifically, according to one or more embodiments of the disclosure as described in detail below, attack detectability metrics are received from nodes along a path in a network. The attack detectability metrics from the nodes along the path are used to compute a path attack detectability value for the path. A determination is made as to whether the path attack detectability value satisfies a network policy and one or more routing paths in the network are adjusted based on the path attack detectability value not satisfying the network policy.

Illustratively, the techniques described herein may be performed by hardware, software, and/or firmware, such as in accordance with the learning machine process 248, which may contain computer executable instructions executed by the processor 220 (or an independent processor of interfaces 210) to perform functions relating to the techniques described herein, e.g., in conjunction with routing process 244. For example, the techniques herein may be treated as extensions to conventional protocols, such as the various PLC protocols or wireless communication protocols, and as such, may be processed by similar components understood in the art that execute those protocols, accordingly.

Operationally, an attack detectability metric for a path is introduced herein that refers to the ability of an attack detection mechanism (e.g., one or more learning machine processes) to detect an attack along a path that include L−1 number of links and L number of nodes. For example, the path attack detectability metric may represent how well a DoS attack may be detected along a given path in the network. The path attack detectability metric may be calculated in various ways, according to different embodiments. In one embodiment, the path attack detectability metric (PDD) may be calculated as follows:

$$PDD = \prod_{i=1}^{i=L} R_i$$

where $R_i$ is the recall of the learning machine on the $i^{th}$ node along the path. In general, recall, also known sometimes as sensitivity, is a measure of how well a learning machine is able to identify relevant information. In the case of attack detection, for example, recall may correspond to the probability of a given learning machine detecting a network attack. In further embodiments, the path attack detectability metric may be calculated by weighting the recall values, adding the recall values, or using other combinations of the recall values. In some embodiments, PDD may be based in whole or in part on a precision value that represents the probability of a learning machine issuing a false positive. In one embodiment, the minimum of path attack detectability metrics calculated using different formals may be used as the overall attack detectability of a path.

As discussed above, a node/device executing a routing process (e.g., routing process 244) may be responsible for the computation of paths in the network. In the case of the IoT, most LLNs will make use of a proactive routing protocol such as RPL, whereby a set of DAGs is rooted at a Field Area Router (FAR). In such a case, the routing protocol is entirely distributed, which also holds true in the case of a reactive routing protocol such as Load-NG. In other forms of routing used in LLNs, a fully centralized approach may be taken, such as by using a Path Computation Element (PCE). In all cases, the routing process may be resident in the FAR or potentially an external controller (e.g., an NMS) that is in charge of determining the set of paths that do not meet the requirement of the traffic routing over these paths (e.g., in accordance with a network policy). In such implementations, the routing process may be referred to for purposes of simplicity as a routing element for attack detection (RED).

Figure 6A:
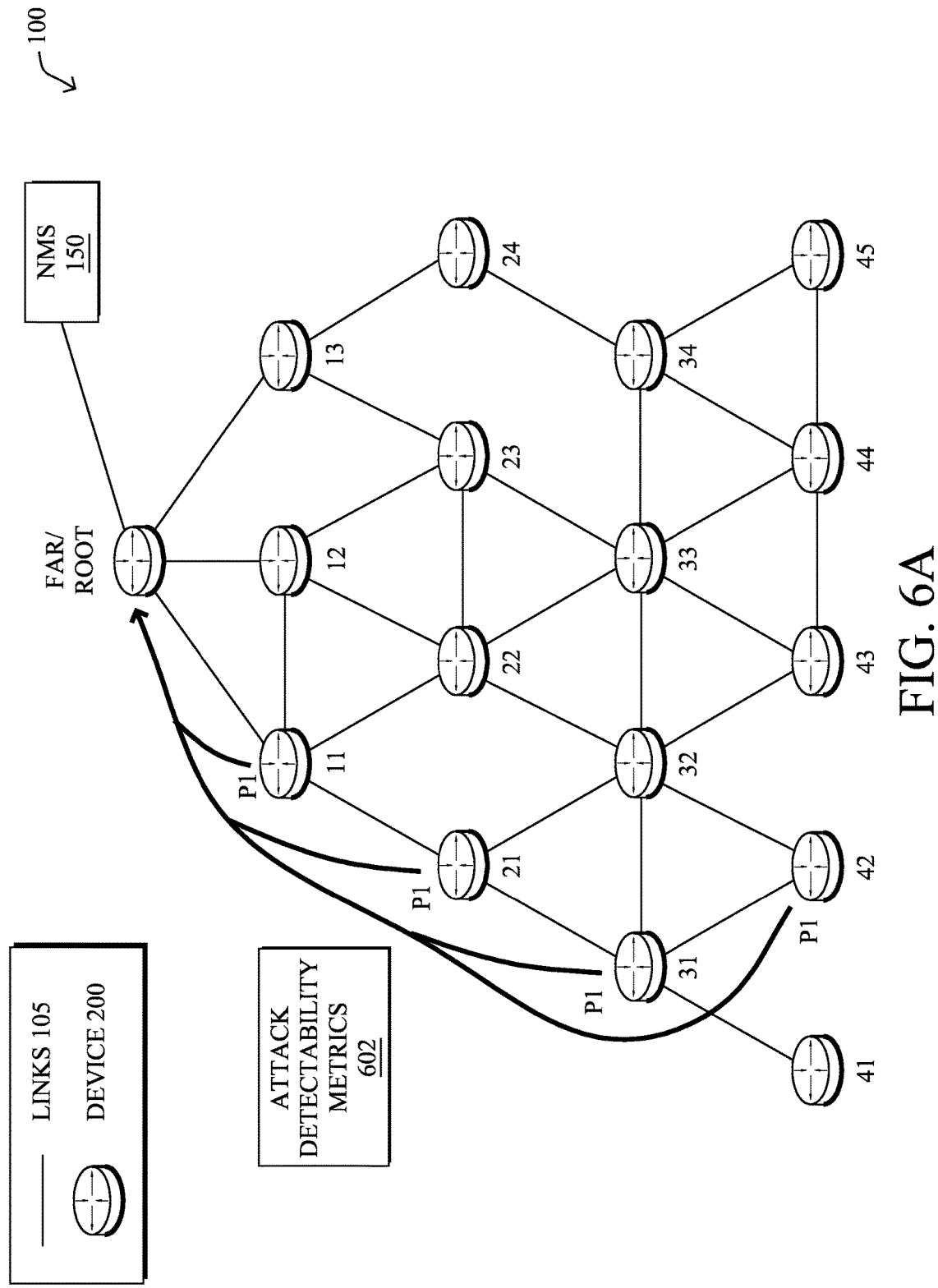
FIGS. 6A-6B illustrate an example of an attack detectability value being determined for a network path.
Figure 6B:
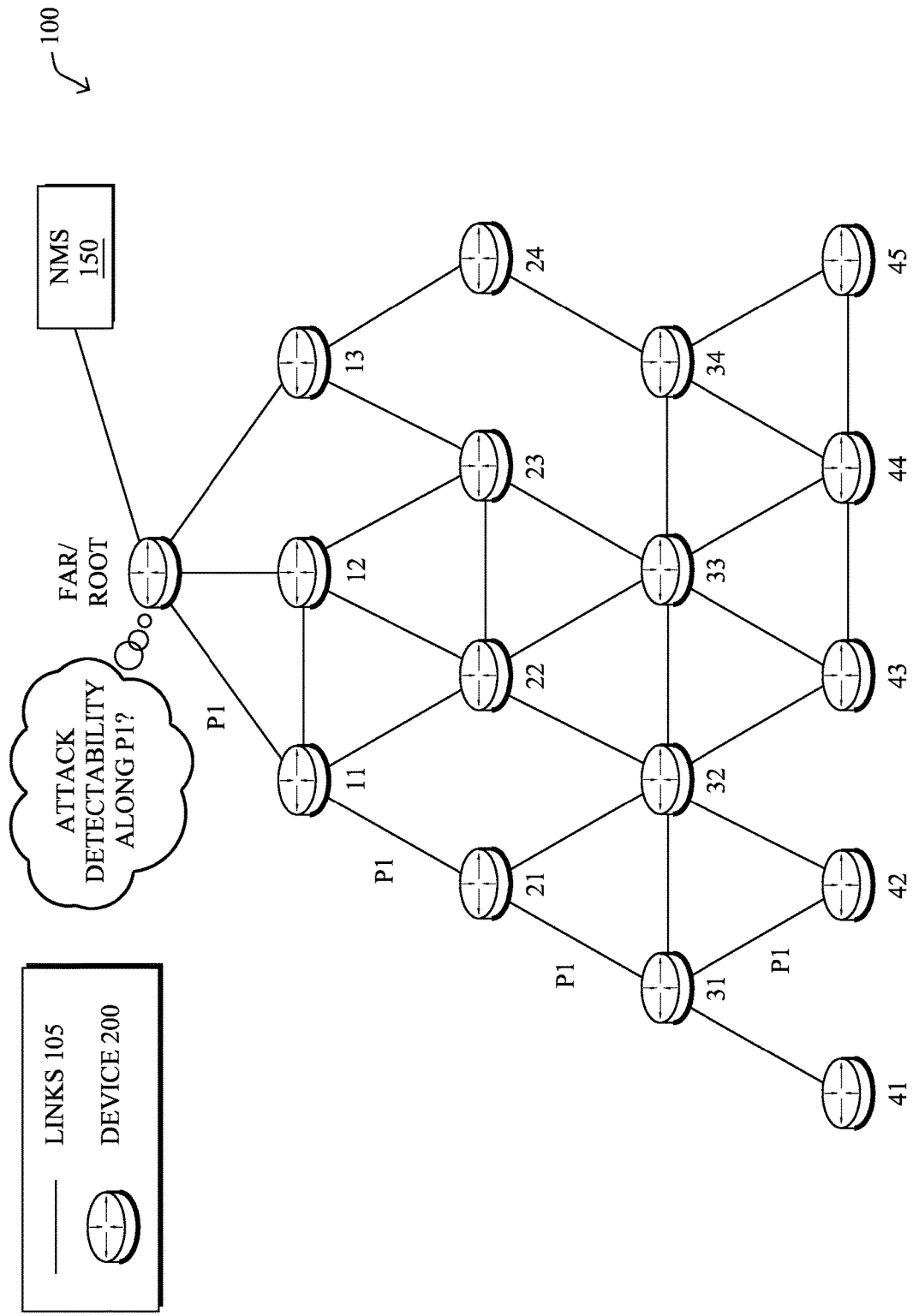

In various embodiments, path attack detectability metrics may be computed for any or all paths in the network. For example, as shown in FIGS. 6A-6B, the FAR/Root node may compute an attack detectability metric for a path P1 that is formed with the communication links between nodes 42, 31, 21, 11, and the FAR. As shown in FIG. 6A, the RED resident on the FAR may receive attack detectability metrics 602 that categorize the ability to detect network attacks for each link and node along each path, such as path P1. In turn, the RED may then compute an attack detectability metric for each path in the network using the individual metrics in metrics 602. Attack detectability metrics 602 may be sent proactively to the RED (e.g., resident on the FAR, NMS 150, etc.) by the various network nodes or may be sent in response to a specific request for the metrics by the RED, according to various implementations.

The RED may identify the possible routing paths in the network in a number of ways. In some cases, if the RED makes use of a PCE, the RED may send a request to the PCE to retrieve all paths computed by the PCE. In one embodiment, such a request may be constructed using an extension of the PCEP protocol specified in RFC6550. If the routing protocol in use in the network is RPL, as is true of many deployed networks today, such paths may already be known by the DAG root. In other words, the RED on the FAR/Root node may already have access to the different routing paths in the network. For example, this is typically the case when using RPL in non-storing mode. In one embodiment, attack detectability metrics 602 may be included in a routing discovery message, such as in a DAO message. If RPL is used in storing mode, the RED may further request attack detectability metrics 602 as part of a DIO message (e.g., to trigger reporting), as a flood request to the network, or in any other manner.

Figure 7A:
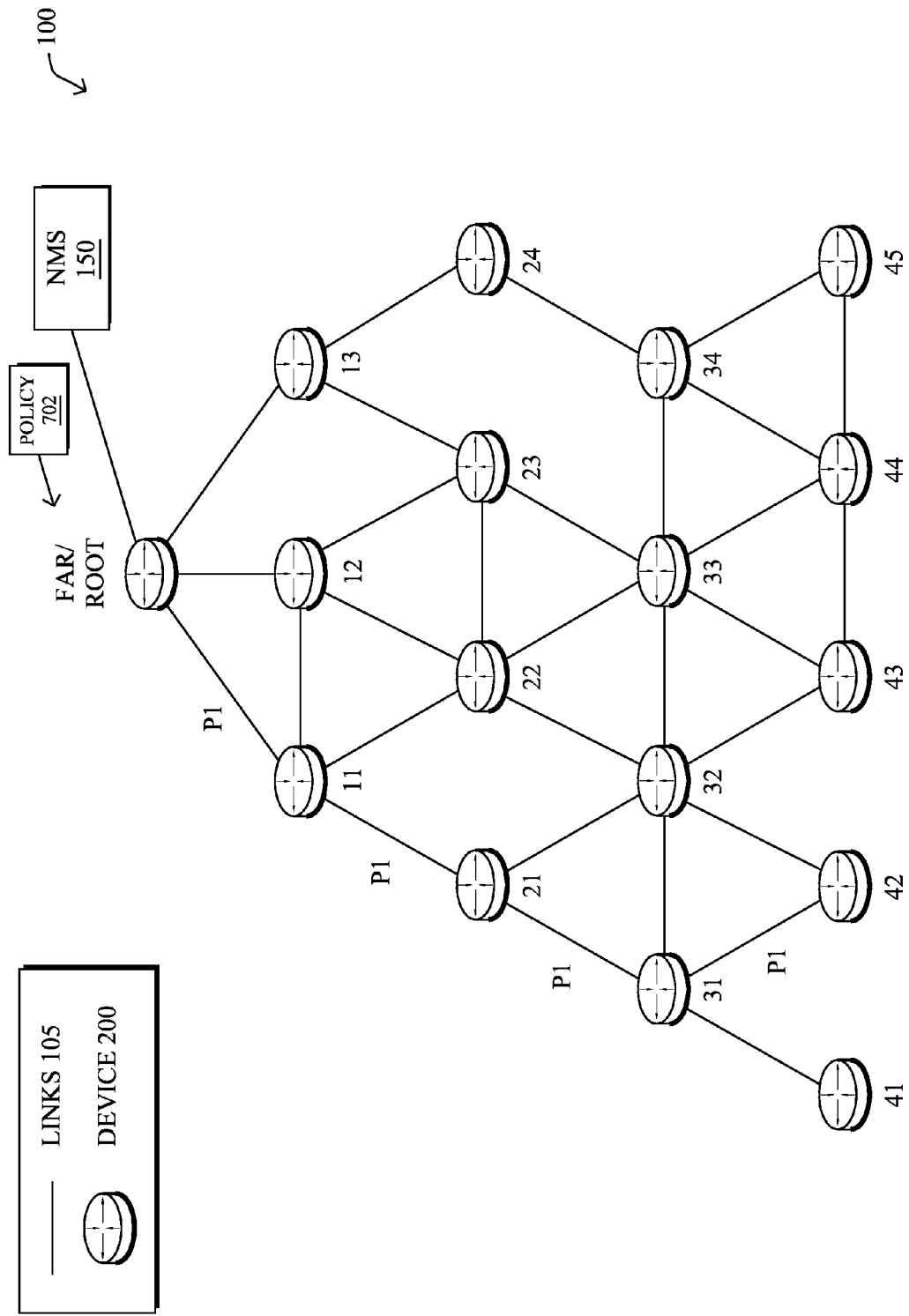
FIGS. 7A-7E illustrate an example of a path attack detectability value being used to make routing decisions based on a network policy.

In various embodiments, a network policy may specify an attack detectability threshold (e.g., an acceptable level of attack detectability for a path chosen to route data). For example, as shown in FIG. 7A, the RED on the FAR/Root node may receive a network policy 702 that specifies an acceptable level of attack detectability. Such a policy may be, for example, a service level agreement (SLA) and may be associated with a particular type of traffic. For example, as shown in FIG. 7A, the RED on the FAR/Root node may receive a network policy 702 that specifies acceptable attack detectability values for one or more types of traffic.

While attack detection is often a universal network requirement, the traffic sensitivity to an attack may vary dramatically. For example, a DoS against a link carrying traffic used to measure power consumption may not be as critical as a DoS attack that impacts real-time traffic used to control a power grid. In one embodiment, the RED may send a request message (e.g., a CoAP, SNMP, etc. message) to the policy engine (e.g., NMS 150), to retrieve the DoS SLA related information for each traffic type in the network (e.g., policy 702). Such information may be represented as a series of tuples of the form <Traffic_type, Recall>. For example, the policy engine may specify that for meter readout traffic, the Recall (e.g., the percentage of DoS attack detection rate) should be at least 60%, whereas the Recall must be higher than 95% for distributed automation traffic.

As noted above, path attack detectability metrics may be computed on a per traffic type basis for any and all traffic types observed in the network. In one embodiment, attack detectability metrics may be computed for each path, regardless of the corresponding network policy (e.g., a DoS SLA metric for a given traffic type, etc.). In other cases, path attack detectability metrics may be computed for each path with the granularity of the network policy (e.g., the traffic-specific DoS SLA).

Figure 7B:
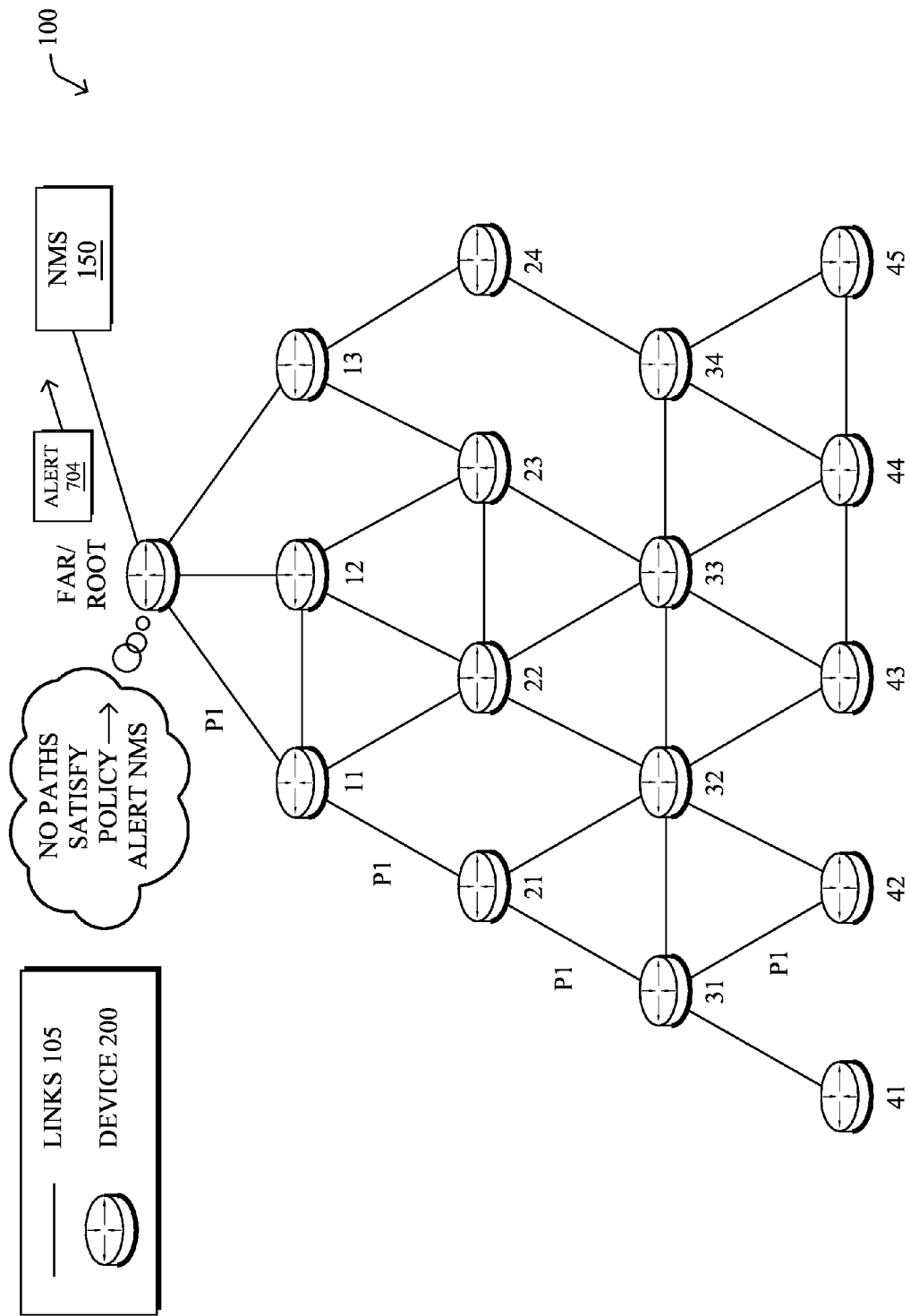

In some cases, the RED may determine the set of paths traversed by each traffic flow of type T (e.g., using various techniques such as DPI, NBAR, . . . ) and identify the set of paths for which the computed attack detectability metrics are lower than that of the different kinds of traffic carried over that path. For example, as shown in FIG. 7B, the RED on the FAR may determine whether or not the attack detectability for path P1 satisfies the policy requirements of the SLA for a given type of traffic. Said differently, some traffic may follow a path in the network for which the system cannot guarantee to detect an attack with a specified degree of recall. The list of paths that carries a set S of traffic types for which the attack detectability values falls below the required recall requirement in the network policy/SLA is referred to herein as PDD'.

The RED may perform any number of actions in cases in which the attack detectability of a path does not satisfy the network policy. In various embodiments, the RED may first attempt to remove all elements in PDD' by computing alternate paths that satisfy the network policy/SLA in terms of attack detectability. In one embodiment, the RED may, for each element of PDD', determines the list of traffic types S and their required DOS SLA metric (Recall). The RED may then begin computing the list of existing paths in the network with a satisfactory attack detectability metrics for an element of S. To that end, the RED module makes use of the routing topology database obtained thanks to the collection of RPL DAO messages stored by the DAG root, or the topology retrieved by the PCE, should a fully centralized computation engine be used in the network. In yet another embodiment, the computation of alternate paths may be conditioned to maximum cost.

For example, the policy engine may specify that the path Recall must be higher than a value R_Min as part of a network policy, as long as the path cost does not exceed a value of Cost_max (or alternatively a path cost increase compared to the existing computed constrained shortest path). If such a path cannot be found, the RED may alert the policy engine to indicate that no path can be found that satisfies the detectability threshold of the policy (e.g., PPD>R_Min) and/or the maximum cost (e.g., Cost<Cost_Max). For example, as shown in FIG. 7C, the RED on the FAR may send an alert message 704 to the policy engine on NMS 150 that indicates that no paths can satisfy the requirements of network policy 702.

Figure 7C:
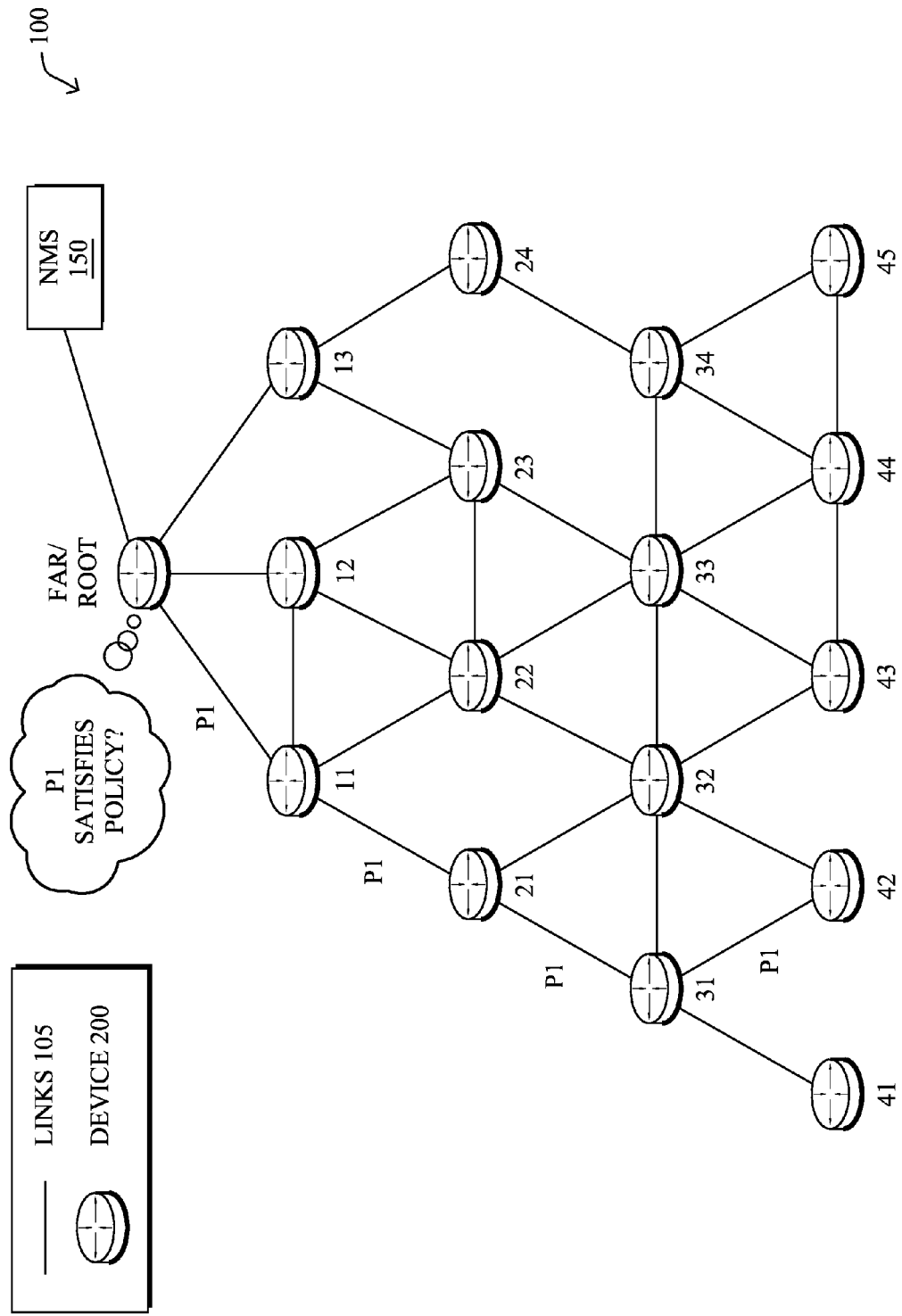
Figure 7D:
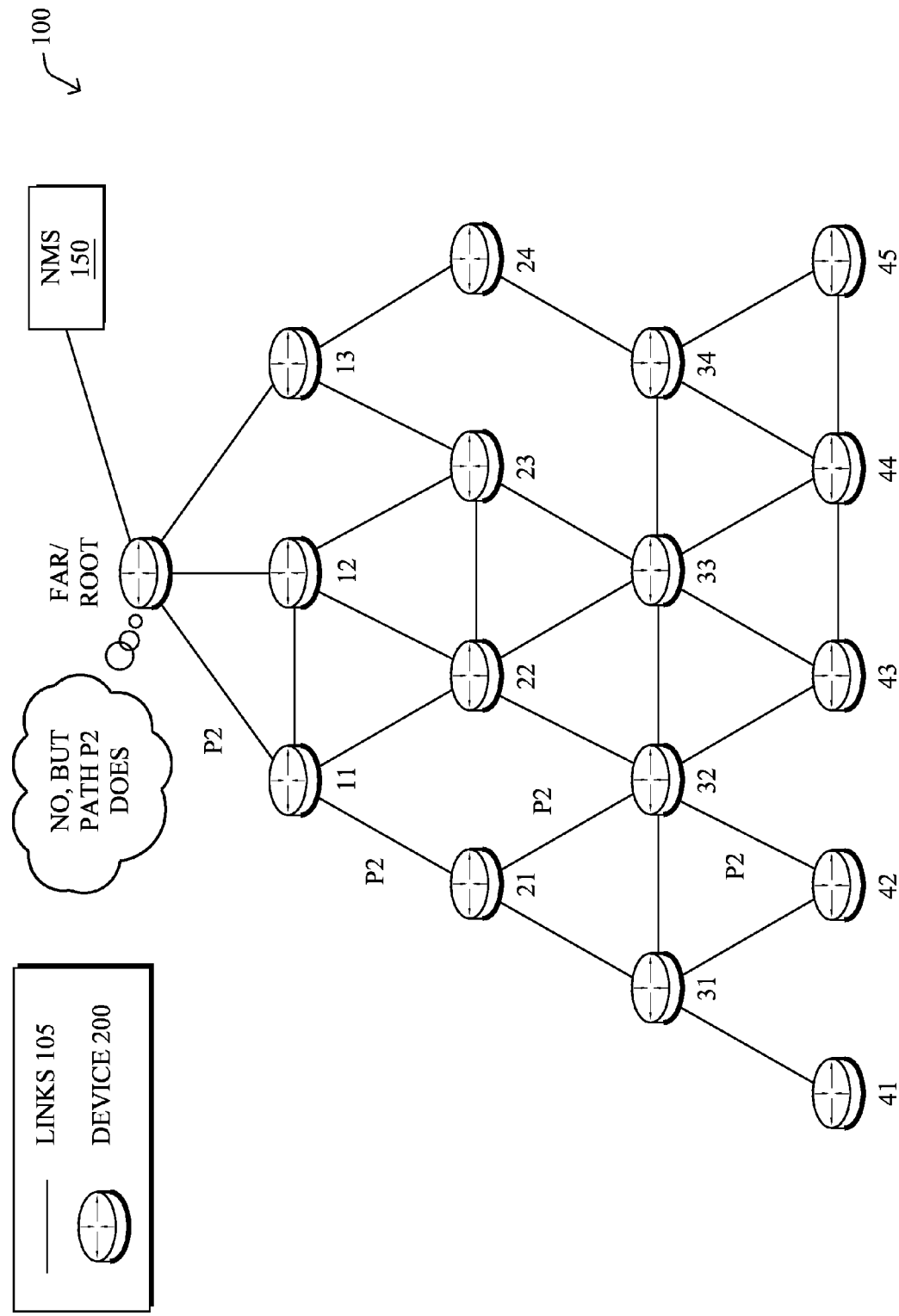
Figure 7E:
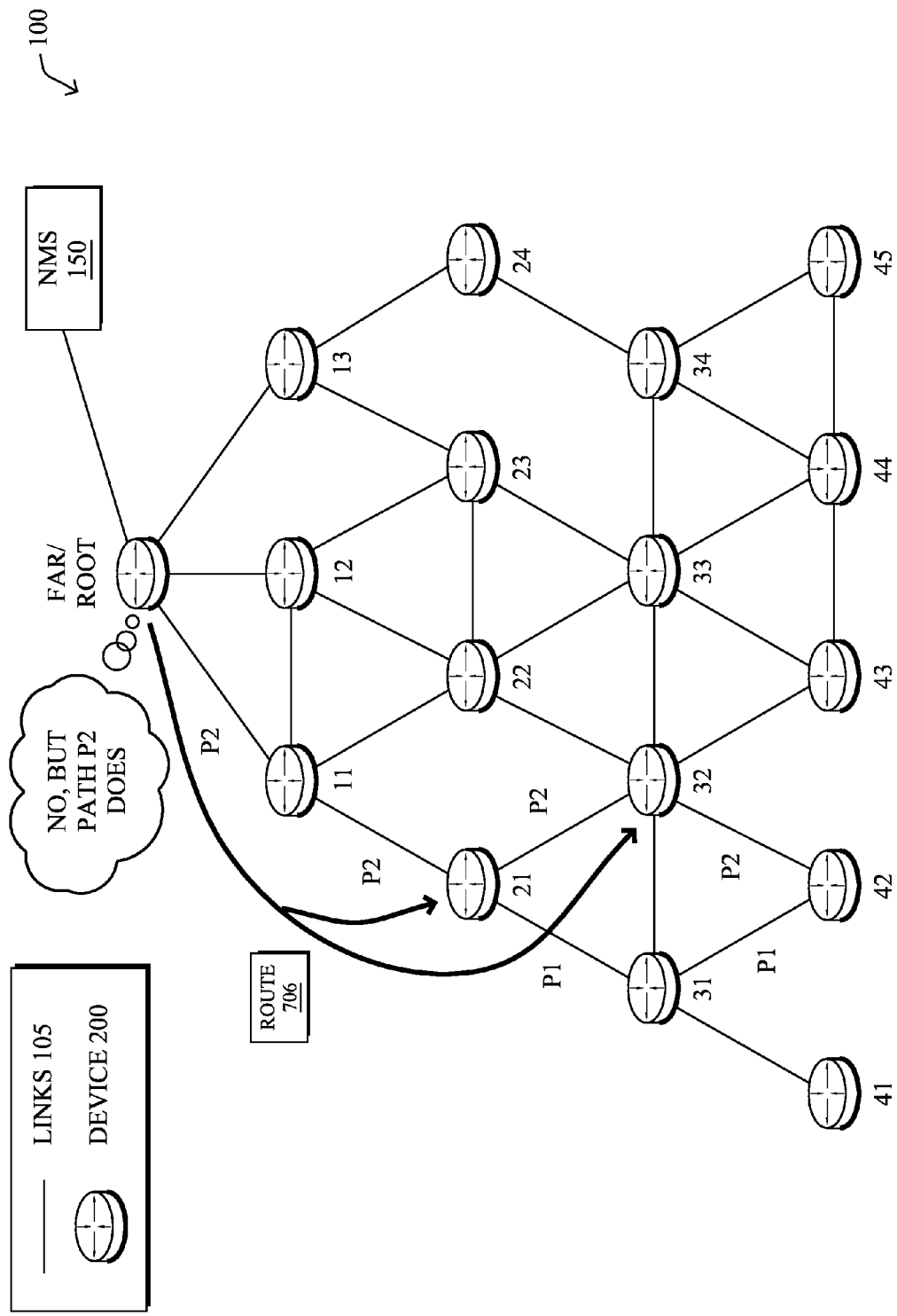

As illustrated in FIGS. 7C-7E, if a path that satisfies the attack detectability requirements of the network policy/SLA is found, the RED may provision a static routing path for a given traffic type or, alternatively, for all traffic types. For example, in FIGS. 7C-7D, the FAR may determine that path P1 does not satisfy the attack detectability SLA, but that path P2 does. In such a case, the RED may install the alternate route 706 via a unicast message sent to any of the affected nodes (e.g., as an IPv6 unicast message), to utilize path P2 instead of P1. Such a message may be sent to node 21, for example, indicating that traffic of type T1 must follow path P2, while the rest of the traffic should be routed along path P1, which was computed by the routing protocol (e.g., as part of DAG 400). As mentioned before, if the SLA metric is traffic type agnostic and not specified on a per traffic type basis, the installed path would be used for all traffic between a given pair of nodes (e.g., path P2 may be used for all traffic types sent to/from node 42).

In some embodiments, a closed-loop control mechanism may be used to meet a path attack detectability policy. For example, instead of overriding the routing decision of the distributed routing protocol, the RED may trigger the computation of an alternative routing topology (e.g., using the DAG construction mechanisms discussed previously). In some cases, the number of static routes may be high enough to justify the use of a separate DAG for a set of traffic in order to meet the DoS SLA for these traffic types. In such a case, the RED component, if not co-located with the DAG Root, may send a request to the Root to form a new DAG. In response to receiving such a request, the Root will start building a new DAG, potentially using a new objective function and specifying the traffic type reserved for forwarding traffic along the new DAG.

Figure 8:
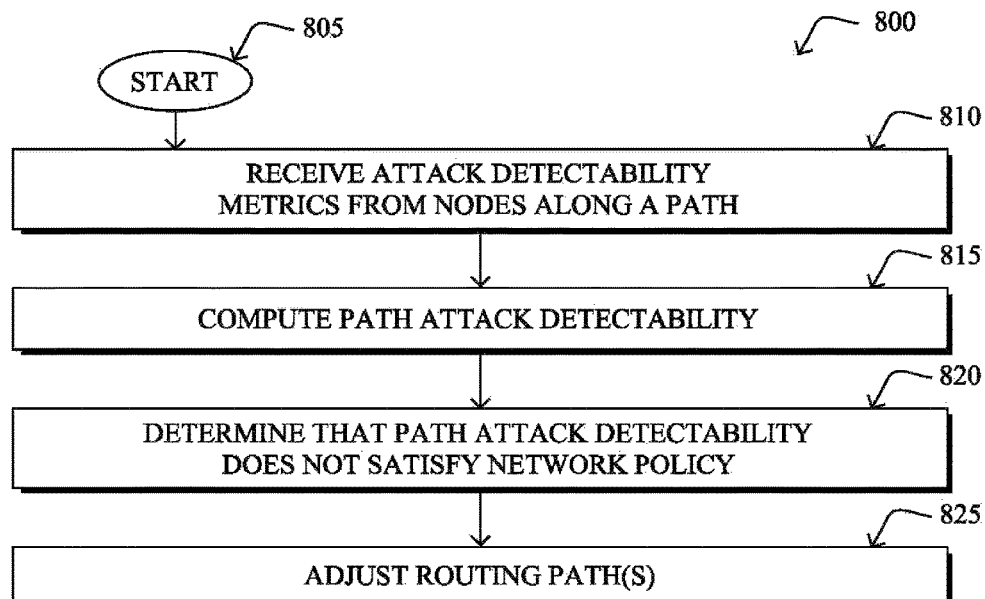
FIG. 8 illustrates an example simplified procedure for making routing decisions using an attack detectability value for a network path.

FIG. 8 illustrates an example simplified procedure for using a path attack detectability metric to make routing decisions in a shared-media communication network, in accordance with one or more embodiments described herein. The procedure 800 may start at step 805, and continues to step 810, where, as described in greater detail above, attack detectability metrics are received from some or all of the nodes located along a given path. In one embodiment, the detectability metrics correspond to recall values (e.g., sensitivity measurements) of learning machine processes executed by the nodes that are used to detect potential attacks. Such a value may be associated with the node itself and/or a communication link between the node and another node.

At step 815, as described in greater detail above, a path attack detectability metric is computed using the attack detectability metrics received from the node(s) along the path. In general, the path attack detectability metric quantifies how well the devices along the path are able to correctly identify the presence of a network attack along the path. Such a metric may be computed in any number of different ways (e.g., as the product of all recall values along the path, using various weightings, etc.). If two or more path attack detectability metrics are computed using different formulas, the metric having the lowest value may be selected, in one embodiment, to represent the detectability along the path.

At step 820, a determination is made that the computed attack detectability metric for the path does not satisfy a network policy, as highlighted above. Such a policy may be, for example, an SLA and may be a global policy that affects all traffic or may be traffic-specific (e.g., different types of traffic may have different attack detectability requirements). For example, an SLA for control command traffic may require a higher degree of attack detection than a less critical type of traffic. Example traffic types may include, but are not limited to, voice traffic (e.g., VoIP traffic), video traffic, data applications, control plane traffic (e.g., control commands sent to a networked device), reporting traffic, and alert/alarm traffic.

At step 825, as described in greater detail above, one or more routing paths are adjusted based on the computed attack detectability metric for the path not satisfying the network policy. In one embodiment, a new routing path that satisfies the policy may be installed at one or more network nodes. For example, a node may be instructed to route a particular type of traffic along one route and all other traffic along another route. In another embodiment, the routing path(s) may be adjusted by computing a new routing topology. For example, a new DAG may be constructed for a particular type of traffic by using the attack detectability requirements of the network policy as part of an objective function. Procedure 800 then ends at step 830.

Figure 9:
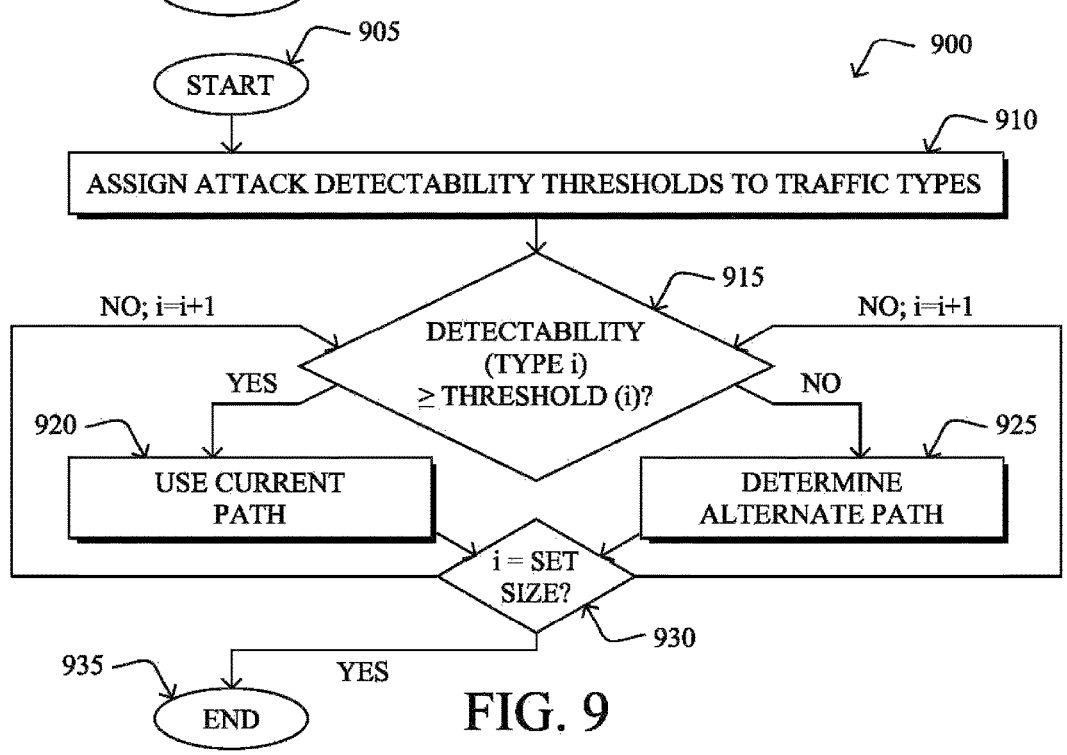
FIG. 9 illustrates an example simplified procedure for assigning different traffic types to different routing paths based on attack detectability values.

FIG. 9 illustrates an example simplified procedure for assigning different traffic types to different routing paths based on attack detectability values, in accordance with one or more embodiments. The procedure 900 may start at step 905, and continues to step 910, where, as described in greater detail above, attack detectability threshold values (e.g., SLAs) are assigned to different traffic types. The traffic types may correspond to any number of different forms of traffic, such as voice, control commands, video, alerts, data reporting, and the like. For example, an SLA for a control command may require a guaranteed attack detectability value of 90% or higher, while an SLA for data reporting non-critical data may only require a guaranteed attack detectability value of 65% or higher.

At step 915, a path detectability metric associated with a particular path and traffic type is compared to the threshold assigned to the traffic type. For example, assume that the current routing path only provides an attack detectability of 75%, but that the SLA for video traffic requires an attack detectability of 80% or higher. If the threshold value is met, procedure 900 continues on to step 920 in which the current path is used to route the particular type of traffic. Such a path may be determined, for example, based on the routing protocol. However, if the path does not satisfy the SLA for the traffic type, an alternate path may be determined and used in step 925. For example, an alternate path may be selected to route video traffic, if the alternate path satisfies the attack detectability SLA for video traffic.

Procedure 900 may be performed iteratively, in some embodiments, until it is determined in step 930 that each of the traffic types has been analyzed. If not, the next traffic type may be analyzed and steps 915, 920, and/or 925 may be repeated. If so, procedure then continues on to step 935 and ends.

It should be noted that while certain steps within procedures 800-900 may be optional as described above, the steps shown in FIGS. 8-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800-900 are described separately, certain steps from each procedure may be incorporated into each other procedure, and the procedures are not meant to be mutually exclusive.

The techniques described herein, therefore, provide for the inclusion and use of a path attack detectability metric to be included in a network policy, such as an SLA. Such a requirement may be on a global scale or may be associated with a particular type of traffic. The specified requirement may then be used to select routing paths for all traffic or for a particular type of traffic in the network. Thus, in some cases, some traffic may continue to follow the path computed by the routing protocol, whereas other traffic may be routed through alternate paths that offer service guarantees in terms of attack detection.

While there have been shown and described illustrative embodiments that provide for dynamic enabling of routing devices in a shared-media communication network, it is to be understood that various other adaptations and modifications may be made within the spirit and scope of the embodiments herein. For example, the embodiments have been shown and described herein with relation to PLC networks. However, the embodiments in their broader sense are not as limited, and may, in fact, be used with other types of shared-media networks and/or protocols (e.g., wireless). In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a device in a communication network, attack detectability metrics from routers along a path in the network;
   computing, by the device, a path attack detectability value using the attack detectability metrics from the routers along the path, wherein the path attack detectability value quantifies how well one or more attack detectors executed by the routers along the path are able to detect an attack along the path;
   determining, by the device, that the path attack detectability value does not satisfy a network policy; and
   adjusting, by the device, one or more routing paths in the network based on the path attack detectability value not satisfying the network policy, wherein the adjusted one or more routing paths guarantee that an attack along the adjusted one or more routing paths is detected at or above a predefined success rate,
   wherein the attack detectability metrics are based on recall values for machine learning processes executed by the routers along the path, wherein the machine learning processes are configured to detect the presence of a network attack.

2. The method as in claim 1, wherein the network policy includes a specified type of traffic, and wherein the path attack detectability value is associated with the type of traffic.

3. The method as in claim 2, further comprising:
   computing, by the device, a second path attack detectability value for a second type of traffic.

4. The method as in claim 3, further comprising:
   instructing, by the device, a particular router in the network to route traffic of the first type along a first route and traffic of the second type along a second route.

5. The method as in claim 1, wherein adjusting the one or more routing paths comprises:
   computing a new routing topology for the network.

6. The method as in claim 1, wherein adjusting the one or more routing paths comprises:
   providing an instruction to a particular router in the network to route traffic along a particular route.

7. The method as in claim 1, further comprising:
   providing, by the device, a notification that no paths in the network have attack detectability values that satisfy the network policy.

8. The method as in claim 1, wherein the attack detectability metrics are received from the routers along the path via routing protocol messages.

9. An apparatus, comprising:
   one or more network interfaces to communicate with a communication network;
   a processor coupled to the network interfaces and adapted to execute one or more processes; and
   a memory configured to store a process executable by the processor, the process when executed operable to:
     receive attack detectability metrics from routers along a path in the communication network;
     compute a path attack detectability value using the attack detectability metrics from the routers along the path, wherein the path attack detectability value quantifies how well one or more attack detectors executed by the routers along the path are able to detect an attack along the path;
     determine that the path attack detectability value does not satisfy a network policy; and
     adjust one or more routing paths in the network based on the path attack detectability value not satisfying the network policy, wherein the adjusted one or more routing paths guarantee that an attack along the adjusted one or more routing paths is detected at or above a predefined success rate,
   wherein the attack detectability metrics are based on recall values for machine learning processes executed by the routers along the path, wherein the machine learning processes are configured to detect the presence of a network attack.

10. The apparatus as in claim 9, wherein the network policy includes a specified type of traffic, and wherein the path attack detectability value is associated with the type of traffic.

11. The apparatus as in claim 10, wherein the process when executed is further operable to:
    compute a second path attack detectability value for a second type of traffic.

12. The apparatus as in claim 11, wherein the process when executed is further operable to:
    instruct a particular router in the network to route traffic of the first type along a first route and traffic of the second type along a second route.

13. The apparatus as in claim 9, wherein the one or more routing paths are adjusted by:
    providing an instruction to a particular router in the network to route traffic along a particular route.

14. The apparatus as in claim 9, wherein the one or more routing paths are adjusted by:
    computing a new routing topology for the network.

15. The apparatus as in claim 9, wherein the process when executed is further operable to:
provide a notification that no paths in the network have attack detectability values that satisfy the network policy.

16. The apparatus as in claim 9, wherein the attack detectability metrics are received from the routers along the path via routing protocol messages.

17. A tangible, non-transitory, computer-readable media having software encoded thereon, the software when executed by a processor operable to:
receive attack detectability metrics from routers along a path in a communication network;
compute a path attack detectability value using the attack detectability metrics from the routers along the path, wherein the path attack detectability value quantifies how well one or more attack detectors executed by the routers along the path are able to detect an attack along the path;
determine that the path attack detectability value does not satisfy a network policy; and
adjust one or more routing paths in the network based on the path attack detectability value not satisfying the network policy, wherein the adjusted one or more routing paths guarantee that an attack along the adjusted one or more routing paths is detected at or above a predefined success rate,
wherein the attack detectability metrics are based on recall values for machine learning processes executed by the routers along the path, wherein the machine learning processes are configured to detect the presence of a network attack.

18. The computer-readable media as in claim 17, wherein the network policy includes a specified type of traffic, and wherein the path attack detectability value is associated with the type of traffic.

* * * * *